3,629,366
SHAPED ARTICLE FROM A MIXTURE OF POLY-ETHYLENE TEREPHTHALATES OF DIFFERENT REDUCED VISCOSITIES
Ludwig Brinkmann, Frankfurt am Main, Germany, assignor to Farbwerke Hoechst Aktiengesellschaft vormals Meister Lucius & Bruning, Frankfurt am Main, Germany
No Drawing. Filed Oct. 11, 1968, Ser. No. 766,941
Claims priority, application Germany, Nov. 9, 1967, P 16 94 218.0
Int. Cl. C08g *39/10*
U.S. Cl. 260—860       8 Claims

ABSTRACT OF THE DISCLOSURE

Process for the manufacture of a polyethylene terephthalate moulding composition of average reduced specific viscosity suitable for injection moulding consisting of at least two polyethylene terephthalates having very different viscosities.

---

The present invention relates to thermoplastic moulding compositions consisting of polyethylene terephthalates of different reduced specific viscosities and having improved properties.

Shaped articles can be made from thermoplastic moulding compositions consisting of linear saturated polyesters of aromatic dicarboxylic acids.

In industry shaped articles are made from moulding compositions of polyethylene terephthalate by injection moulding. In this process high molecular weight polyethylene terephthalates are used which have been modified in suitable manner. There are used, for example, polyethylene terephthalates containing finely divided, solid inorganic substances. Furthermore, moulding compositions have been proposed on the basis of polyethylene terephthalate modified with polymers such as polyethylene or polypropylene. From moulding compositions of this kind dimensionally stable shaped articles can also be made. The polyester moulding compositions to be used for injection moulding contain polyethylene terephthalate having a particularly high molecular weight. The reduced specific viscosity is in the range of from 1.2 to 1.5 dl./g., measured with a 1% solution of the polymer in a 60:40 mixture of phenol and tetrachloroethane at 25° C.

Polyethylene terephthalates having the high reduced specific viscosities required for the manufacture of polyester moulding compositions are preferably produced by a post-condensation in solid phase as described in German Patent 930,231. For this purpose granular or powdery polyethylene terephthalate is heated in the solid state at a temperature above 200° C. under reduced pressure or in a current of an inert gas, suitably while keeping the granules in motion.

For the manufacture of polyester moulding compositions, a polyester in the form of granules obtained by the known condensation process in the melt is modified in suitable manner with a substance promoting the dimensional stability of the shaped article and then subjected to post-condensation in the solid phase until the material has acquired the desired reduced specific viscosity of from 1.2 to 1.5 dl./g. Alternatively, the granulated polyester obtained by condensation in the melt is subjected to a post-condensation in the solid phase until a reduced specific viscosity is reached that is sufficiently above the required reduced viscosity of the moulding composition, the granules are treated with a nucleating agent or another agent improving the dimensional stability of the shaped article, the mixture is homogenized in a extruder, extruded whilst cooling and granulated again. The reduced specific viscosity is then reduced to the required value by the degradation of the polyester during extrusion.

It is known that polyethylene terephthalates having a reduced specific viscosity below 1.0 dl./g. yield shaped articles of very low impact strength. Polyethylene terephthalates having a reduced specific viscosity substantially above 1.5 dl./g. yield shaped articles of high distortion. Hitherto polyethylene terephthalates of this kind could not be used for the manufacture of polyester compositions for injection moulding.

It has now been found that thermoplastic moulding compositions consisting of polyethylene terephthalate and having an average reduced specific viscosity of from 0.5 to 2.0 dl./g., measured in a 1% polymer solution in a 60:40 mixture of phenol and tetrachloroethane at 25° C., can advantageously be prepared by mixing at least two polyethylene terephthalates, the reduced specific viscosities of which differ by 0.02 to 1.0 units.

The polyesters to be mixed have a reduced specific viscosity of from 0.5 to 2.0, preferably 1.0 to 1.5 and differ in their reduced specific viscosity by 0.02 to 1.0, preferably 0.05 to 0.35 units. The starting polyesters are used in an amount such that the desired average reduced specific viscosity of the mixture is attained according to the regulations of alligation. For the production of shaped articles by injection moulding the polyester composition should have an average reduced specific viscosity preferably in the range of from 1.0 to 1.5 dl./g.

It was surprising that mixtures of polyethylene terephthalates are suitable for injection moulding as mixtures of polyethylene terephthalates the reduced specific viscosities of which differ by more than 0.02 unit give troubles when processed into fibers or filaments. In contradistinction thereto, mixtures of polyethylene terephthalates having substantially higher differences in their reduced specific viscosity can be injection moulded without difficulty and yield distortion-free shaped articles having good mechanical properties. It has also been surprising that even sheets of large dimensions produced from a mixture of polyethylene terephthalates having considerably different reduced specific viscosities, i.e. a material with a broad molecular weight distribution, are free from distortion, the more so as moulding compositions with broad molecular weight distribution, for example polyethylene with broad molecular weight distribution, yield shaped articles having a strong distortion.

The process of the invention is preferably used for polyethylene terephthalate, but there may also be used modified polyethylene terephthalates containing, in addition to terephthalic acid units, units of other aromatic or aliphatic dicarboxylic acids, for example isophthalic acid, naphthalene-2,6-dicarboxylic acid or adipic acid, and in addition to ethylene glycol units, units of other aliphatic of cycloaliphatic diols, for example neopentyl glycols, butane-diol-1,4- or 1,4-dimethylolcyclohexane, as alcoholic component.

The polyester moulding compositions of the invention suitably contain finely divided inorganic substances or polymers, for example polyethylene or polypropylene. By adding inorganic or organic substances of this kind the polycondensation product reaches a good degree of crystallization during moulding at a sufficiently high temperature of the mould and shrinking of the shaped articles on heating at higher temperatures is avoided or kept low. Suitable inorganic finely divided substances are, for example, calcium carbonate, aluminum silicate, talcum or soot. The particle size of said substances should be below 2 microns. They can be added to the polyester moulding compositions in known manner at different stages of the manufacturing process.

The powdered or granulated polyesters are mixed in suitable mixing apparatus, for example a tumbling drier with eccentric axis. As the polyester moulding compositions should contain as little moisture as possible, preferably less than 0.01% by weight, it is expedient to mix with exclusion of moisture, for example in an atmosphere of nitrogen. To prevent the polyester moulding composition from taking up moisture it may be coated with a hydrophobic substance, for example paraffin or wax. The mould is suitably heated at a temperature that is sufficiently high above the second order transition temperature of the polyester.

The following examples serve to illustrate the invention but they are not intended to limit it thereto.

EXAMPLE 1 (comparative example)

Dry polyethylene terephthalate having a reduced specific viscosity of 0.86 dl./g., measured in a 1% solution in a 60:40 mixture of phenol and tetrachloroethane at 25° C. was subjected to rotation with exclusion of moisture together with 0.2% by weight of powdered aluminum silicate (47% of $SiO_2$, 38% of $Al_2O_3$, 75% of particles below 2 microns). The polyester composition was melted in an extruder, homogenized, extruded whilst cooling and granulated. The granules were dried for 2 hours at 100° C. under a pressure of 0.4 mm. of mercury in a tumbling drier with eccentric axis and then subjected to post-condensation in solid phase for 8 hours at 240° C. under a pressure of 0.4 mm. of mercury. The polyester obtained had a reduced specific viscosity of 1.40 dl./g. Granules of the polyester were subjected to rotation for 3 hours at 90° C. with exclusion of moisture together with 0.3% by weight of a paraffin having a drop point of 56° C. Dimensionally stable sheets of size 60 x 60 x 2 mm. were produced from the granules at a mould temperature of 150° C. and a residence time in the mould of 20 seconds. The sheets had a density of 1.377.

The impact strength of the sheets was tested in a drop test wherein the sheets were subjected to impact stress by allowing a falling body to drop vertically from different heights on to the sheet clamped in a frame. The tip of the dropping hammer formed a hemisphere having a radius of 10 mm. The hammer weighed 1 kg. Ten sheets were tested for each height.

EXAMPLE 2

By the process described in Example 1 a first polyester composition was prepared having a reduced specific viscosity of 1.32 dl./g., measured in a 1% solution in a 60:40 mixture of phenol and tetrachloroethane at 25° C. and a second polyester composition was prepared having a reduced specific viscosity of 1.48 dl./g.

Equal amounts of both polyester compositions were uniformly blended in a tumbling drier with eccentric axis. A sheet of size 400 x 300 x 2 mm. moulded from the said polyester composition was free from distortion. Sheets of dimension 60 x 60 x 2 mm. moulded from the granules as described in Example 1 had a density of 1.378. The impact strength of the sheets was tested as specified in Example 1. The result of the drop test is indicated in the following table.

EXAMPLE 3

By the process described in Example 1 a first polyester composition was produced having a reduced specific viscosity of 1.29 dl./g., measured in a 1% solution in a 60:40 mixture of phenol and tetrachloroethane at 25° C., and a second polyester composition was produced having a reduced specific viscosity of 1.43 dl./g. 29 kilograms of the first polyester composition and 91 kilograms of the second polyester composition were uniformly blended in a tumbling drier. Part of the blend was moulded into a sheet of size 400 x 300 x 2 mm. The sheet was free from distortion. Furthermore sheets of size 60 x 60 x 2 mm. were injection moulded from the granules as described in Example 1. The sheets had a density of 1.377. Their impact strength was tested as described in Example 1. The result of the drop test is indicated in the following table.

EXAMPLE 4

Polyethylene terephthalate granules having a reduced specific viscosity of 1.54 dl./g., measured in a 1% solution in a 60:40 mixture in phenol and tetrachloroethane at 25° C., were subjected to rotation together with 0.2% by weight of powdered aluminum silicate (47% of $SiO_2$, 38% of $Al_2O_3$, 75% of particles had a size below 2 microns) with the exclusion of moisture. Part of the granules thus treated were melted in a extruder, the mixture was homogenized, extruded whilst cooling and granulated. The granules were dried for 2 hours at 100° C. under a pressure of 0.3 mm. of mercury and then for 5 hours at 180° C. under a pressure of 0.3 mm. of mercury. The granules were then heated for 3 hours at 240° C. at atmospheric pressure in an atmosphere of dry nitrogen. The polyester granules obtained had a reduced specific viscosity of 1.37 dl./g. 21.2 kilograms of the starting polyester treated with aluminum silicate powder (reduced specific viscosity 1.54 dl./g.) and 98.8 kilograms of the polyester having a reduced specific viscosity of 1.37 were uniformly blended in a tumbling drier and the blend was subjected to rotation for 2 hours at 90° C. together with 360 grams of paraffin (drop point 56° C.) in a nitrogen atmosphere.

A sheet having the dimensions 400 x 300 x 2 mm. injection moulded from the polyester composition was free from distortion. Sheets of size 60 x 60 x 2 mm. injection moulded from the granules had a density of 1.378. The impact strength of the sheets was tested as described in Example 1. The result of the drop test is indicated in the following table.

EXAMPLE 5

By the process described in Example 1, a first polyester composition was produced having a reduced specific viscosity of 0.86 dl./g., measured in a 1% solution in a 60:40 mixture of phenol and tetrachloroethane at 25° C., and a second polyester composition was produced having a reduced specific viscosity of 1.57 dl./g. 12.0 kilograms of the first polyester composition and 38.0 kilograms of the second polyester composition were uniformly blended in a tumbling drier. A sheet having the dimensions 60 x 60 x 2 mm. injection moulded from the granules had a density of 1.378. The impact strength was tested as described in Example 1. The result of the drop test is indicated in the following table.

Comparative Examples 6 and 7 illustrate that shaped articles made from the individual starting polyesters used in Example 5 for the blend have poor properties of use.

EXAMPLE 6 (comparative example)

Sheets of size 60 x 60 x 2 mm. were injection moulded from polyethylene terephthalate having a reduced specific viscosity of 0.86 dl./g., measured in a 1% solution in a 60:40 mixture of phenol and tetrachloroethane at 25° C., and containing 0.2% by weight of powdered aluminum silicate (47% of $SiO_2$, 38% of $Al_2O_3$, 75% of particles had a size below 2 microns). The sheets had a density of 1.379. The impact strength was tested as described in Example 1. The result of the drop test indicated in the table shows that the impact strength of the sheets was unsatisfactory. A sheet injection moulded from the polyester granules in a size of 400 x 300 x 2 mm. was free from distortion.

EXAMPLE 7 (comparative example)

Sheets of size 60 x 60 x 2 mm. were injection moulded from polyethylene terephthalate having a reduced specific viscosity of 1.57 dl./g., measured in a 1% solution in a 60:40 mixture of phenol and tetrachloroethane at 25° C., and containing 0.2% by weight of powdered aluminum silicate (47% of $SiO_2$, 38% of $Al_2O_3$, 75% of particles having a size below 2 microns). The sheets produced at a residence time in the mould of 20 seconds had a density of 1.365 and were strongly distorted. The results indicated in the table show that the sheets had a high impact strength. But they were of little value on account of their high distortion.

TABLE

| Polyethylene terephthalate | Density $d_4^{20}$ of sheets [a] | Falling height $F_{20}$ [b] in cm. |
| --- | --- | --- |
| Polyester of Example 1 (RSV 1.40 [c]) | 1.377 | 225 |
| Blend of Example 2 (equal amounts of polyesters with RSV 1.32 and RSV 1.48) | 1.378 | 230 |
| Blend of Example 3 (29 kg. of polyester with RSV 1.29 and 91 kg. of polyester with RSV 1.43) | 1.377 | 215 |
| Blend of Example 4 (21.2 kg. of polyester with RSV 1.54 and 98.8 kg. of polyester with RSV 1.37) | 1.378 | 225 |
| Blend of Example 5 (12 kg. of polyester with RSV 0.86 and 38 kg. of polyester with RSV 1.57) | 1.378 | 225 |
| Polyester of Example 6 (with RSV 0.86) | 1.379 | 50 |
| Polyester of Example 7 (with RSV 1.57) | [d] 1.365 | 250 |

[a] Mould temperature 150° C., residence time in mould 20 seconds.
[b] Height at which the impact energy was sufficient to break 20% of the sheets.
[c] Reduced specific viscosity, measured in a 1% solution of the polyester in a 60:40 mixture of phenol and tetrachloroethane at 25° C.
[d] Sheets distorted.

What is claimed is:

1. A shaped, injection molded article from a molding composition comprising an intimate mixture of granules of at least two polyethylene terephthalates having an average reduced specific viscosity, measured in a 1% solution of the polyester in a 60:40 mixture of phenol and tetrachloroethane at 25° C., in the range of from 0.5 to 2.0 dl./g., and individual reduced specific viscosities of from 0.5 to 2.0 dl./g., measured in a 1% solution of the polyester in a 60:40 mixture of phenol and tetrachloroethane at 25° C., said individual viscosities differing from one another by 0.02 to 1.0 unit.

2. A shaped, injection molded article as defined in claim 1, wherein the mixed polyethylene terephthalates have reduced specific viscosities in the range of from 1.0 to 1.5 dl./g. differing from one another by 0.05 to 0.35 unit.

3. A shaped, injection molded article as defined in claim 1, wherein the average reduced specific viscosity of the polyethylene terephthalates is from 1.0 to 1.5.

4. A shaped, injection molded article as defined in claim 1, wherein the polyethylene terephthalates contain, in addition to terephthalic acid units, units of other aromatic or aliphatic dicarboxylic acids.

5. A shaped, injection molded article as defined in claim 4, wherein the polyethylene terephthalates contain, in addition to terephthalic acid units, units of isophthalic acid, naphthalene-2,6-dicarboxylic acid or adipic acid.

6. A shaped, injection molded article as defined in claim 1, wherein the polyethylene terephthalates contain, in addition to ethylene glycol units, units of other aliphatic or cycloaliphatic diols.

7. A shaped, injection molded article as defined in claim 6, wherein the polyethylene terephthalates contain, in addition to ethylene glycol units, units of neopentyl glycol, butanediol-1,4- or 1,4-dimethylolcyclohexane.

8. A molding composition comprising an intimate mixture of granules of at least two polyethylene terephthalates having an average reduced specific viscosity, measured in a 1% solution of the polyester in a 60:40 mixture of phenol and tetrachloroethane at 25° C., in the range of from 0.5 to 2.0 dl./g., and individual reduced specific viscosities of from 0.5 to 2.0 dl./g., measured in a 1% solution of the polyester in a 60:40 mixture of phenol and tetrachloroethane at 25° C., said individual viscosities differing from one another by 0.02 to 1.0 unit.

References Cited

UNITED STATES PATENTS

| 3,299,172 | 1/1967 | Schade et al. | 260—860 |
| 3,305,604 | 2/1967 | Armstrong et al. | 260—860 |
| 3,382,295 | 5/1968 | Taylor et al. | 260—860 |
| 3,466,348 | 9/1969 | Wiener | 260—860 |

FOREIGN PATENTS

| 1,040,470 | 8/1966 | Great Britain | 260—860 |

WILLIAM SHORT, Primary Examiner

E. WOODBERRY, Assistant Examiner